US009466143B1

(12) United States Patent
Walvoord et al.

(10) Patent No.: US 9,466,143 B1
(45) Date of Patent: Oct. 11, 2016

(54) GEOACCURATE THREE-DIMENSIONAL RECONSTRUCTION VIA IMAGE-BASED GEOMETRY

(71) Applicant: Exelis Inc., McLean, VA (US)

(72) Inventors: Derek J. Walvoord, Rochester, NY (US); Adam J. Rossi, Rochester, NY (US); Bernard V. Brower, Webster, NY (US); Bradley D. Paul, Rochester, NY (US)

(73) Assignee: Exelis, Inc., McLean, VA (US)

( * ) Notice: Subject to any disclaimer, the term of this patent is extended or adjusted under 35 U.S.C. 154(b) by 516 days.

(21) Appl. No.: 13/887,096

(22) Filed: May 3, 2013

(51) Int. Cl.
| | |
|---|---|
| *G06T 15/20* | (2011.01) |
| *G06T 15/00* | (2011.01) |
| *G06T 19/00* | (2011.01) |
| *H04N 13/02* | (2006.01) |
| *A63F 13/5252* | (2014.01) |

(52) U.S. Cl.
CPC .............. *G06T 15/00* (2013.01); *G06T 15/20* (2013.01); *G06T 19/003* (2013.01); *H04N 13/0282* (2013.01); *A63F 13/5252* (2014.09)

(58) Field of Classification Search
None
See application file for complete search history.

(56) References Cited

U.S. PATENT DOCUMENTS

| | | |
|---|---|---|
| 6,587,601 B1 | 7/2003 | Hsu et al. |
| 6,597,818 B2 | 7/2003 | Kumar et al. |

OTHER PUBLICATIONS

Strothoff, Sven, et al., "Interactive generation of virtual environments using muays." VR Innovation (ISVRI), 2011 IEEE International Symposium on. IEEE, 2011.*
Turner, Darren, Arko Lucieer, and Christopher Watson., "An automated technique for generating georectified mosaics from ultra-high resolution unmanned aerial vehicle (UAV) imagery, based on structure from motion (SfM) point clouds." Remote Sensing 4.5 (2012): 1392-1410.*
Tack, Frederik, Gurcan Buyuksalih, and Rudi Goossens. "3D building reconstruction based on given ground plan information and surface models extracted from spaceborne imagery." ISPRS Journal of Photogrammetry and Remote Sensing 67 (2012): 52-64.*
Manual of Photogrammetry, 5th Edition, Edited by J. Chris McGlone, Published by American Society for Photogrammetry and Remote Sensing, 2004; pp. 827-829.
(Continued)

*Primary Examiner* — Mark Zimmerman
*Assistant Examiner* — Sarah Le
(74) *Attorney, Agent, or Firm* — Edell, Shapiro & Finnan LLC (57) ABSTRACT

A technique for generating a three-dimensional reconstruction of a scene involves generating a high-fidelity point cloud representing a three-dimensional reconstruction of a scene from two-dimensional images generated by at least one sensor whose position and orientation are known relative to a fixed coordinate system for each of the images. The high-fidelity point cloud is generated in a relative coordinate system without regard to the position and orientation of the sensor(s). A low-fidelity point cloud is generated in the fixed coordinate system from the two-dimensional images using the position and orientation of the sensor(s) relative to the fixed coordinate system. A transformation between the relative and fixed coordinate systems is determined based on a relationship between points in the high-fidelity and low-fidelity point clouds, and the high-fidelity point cloud is converted from the relative coordinate system to the fixed coordinate system by applying the transformation to the high-fidelity point cloud.

20 Claims, 7 Drawing Sheets

(56) References Cited

OTHER PUBLICATIONS

Crandall, D. et al., "Discrete-continuous optimization for large-scale structure from motion," in [Computer Vision and Pattern Recognition (CVPR)], 3001-3008, ACM Press, Bloomington, IN, USA (2011).

Kabsch, W., "A solution for the best rotation to relate two sets of vectors,"Acta Crystallographica Section A 32, 922-923 (Sep. 1976).

Kabsch, W., "A discussion of the solution for the best rotation to relate two sets of vectors,"Acta Crystallographica Section A 34, 827-828 (Sep. 1978).

Nilosek, D. et al., "Geo-accurate model extraction from three-dimensional image-derived point clouds," in [Proceedings of the SPIE, SPIE Defense and Security Sensing, Algorithms and Technologies for Multispectral, Hyperspectral, and Ultraspectral Imagery XVIII, Modeling and Simulation], 8390, SPIE (Apr. 2012).

Snavely, N. et al., "Photo tourism: Exploring photo collections in 3d," in [SIGGRAPH Conference Proceedings], 835-846, ACM Press, New York, NY, USA (2006).

\* cited by examiner

GEOACCURATE THREE-DIMENSIONAL RECONSTRUCTION VIA IMAGE-BASED GEOMETRY

BACKGROUND

In the field of Computer Vision, the technique of structure from motion (SfM) refers to the process of constructing a point cloud that estimates three-dimensional structures from a set of two-dimensional images, such as a sequence of two-dimensional images of a scene taken from different perspectives. The resulting reconstructed, three-dimensional image is created in a relative coordinate system (e.g., an arbitrary world coordinate system (WCS)) that satisfies the established image geometry but without knowledge of its relationship to a fixed, earth-based coordinate system. The problem of obtaining a geoaccurate three-dimensional point cloud has received little attention in the literature, largely due to a perceived barrier between the fields of Computer Vision and traditional photogrammetry. It has been proposed that the relative model from the SfM process may be manually placed into a desired fixed, earth-based coordinate system using ground control points (GCPs). Attempts have also been made to alter the default initialization of the adjustment algorithm in SfM using geotags and vanishing point estimates or by using metadata containing sensor position and orientation information. Others have proposed geo-spatial registration of imagery.

A major shortcoming of many geo-spatial registration methodologies is the use of an external digital elevation map (DEM) to achieve accurate geolocation. Use of geotags as prior geolocation information in the adjustment process has been demonstrated to obtain geoaccurate ground-level reconstruction. However, attempts at a similar process for airborne imagery resulted in undesirable global translation due to drift in the algorithm employed. Using external position and/or orientation information as initialization parameters introduces undesirable error into the adjustment process of SfM, which may produce larger inaccuracy for long-distance image capture, e.g., from airborne or satellite platforms. Accordingly, there remains a need for techniques for obtaining geoaccurate image-based three-dimensional scene reconstructions in the absence of ground control points or an external DEM.

SUMMARY

Described herein is a technique for generating a geoaccurate three-dimensional reconstruction of a scene. The technique involves generating a high-fidelity point cloud representing a three-dimensional reconstruction of a scene from a plurality of two-dimensional images generated by at least one sensor whose position and orientation are known relative to a fixed coordinate system for each of the two-dimensional images. However, the high-fidelity point cloud is generated in a relative coordinate system without regard to the position and orientation of the sensor(s) relative to the fixed coordinate system. A low-fidelity point cloud is generated in the fixed coordinate system from the plurality of two-dimensional images using the position and orientation of the sensor(s) relative to the fixed coordinate system. A transformation between the relative coordinate system and the fixed coordinate system is determined based on a relationship between points in the high-fidelity point cloud and points in the low-fidelity point cloud, and the high-fidelity point cloud is converted from the relative coordinate system to the fixed coordinate system by applying the transformation to points in the high-fidelity point cloud.

By way of example, the high-fidelity point cloud can be generated using structure from motion (SfM) processing in which the primary sources of error include relatively small feature extraction errors and correspondence errors among the two-dimensional images, while avoid introducing physical sensor model errors, including errors in the position and orientation of the sensor(s). The relative coordinate system can be an arbitrary world coordinate system (WCS) while the fixed coordinate system can be an earth-based coordinate system, where the low-fidelity point cloud is generated based on the physical sensor model of the sensor(s), specifically, the ground-to-image function of the sensor(s). The position and orientation of the sensor(s) can be received as metadata associated with each of the two-dimensional images. For example, the metadata can include global positioning system (GPS) data and inertial navigation system (INS) data. In the case of the low-fidelity point cloud, the more significant position and orientation errors of the sensor(s) result in a much more "noisy" point cloud, though this lower-fidelity point cloud is situated in the desired fixed coordinate system.

The low-fidelity point cloud can be a sparse point cloud with fewer points than the high-fidelity point cloud. The transformation can be determined using this sparse low-fidelity point cloud and a sparse high-fidelity point cloud containing only a subset of the points in the high-fidelity point cloud. The transformation can be implemented as a transformation matrix that is applied to each point in the high-fidelity point cloud to perform translation, scaling and rotation such that relative distances between the points in the high-fidelity point cloud are maintained in the fixed coordinate system. Unlike conventional approaches, the high-fidelity point cloud is converted from the relative coordinate system to the fixed coordinate system without use of a digital elevation map (DEM) or ground control points (GCPs) and avoids the need for manual registration between the point cloud and externally generated references in the fixed coordinate system.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Described herein is a novel approach for obtaining geoaccurate, image-based three-dimensional scene reconstructions in the absence of ground control points or a digital evaluation map (DEM) by using a SfM framework and the full physical sensor model of the collection system. Absolute position and orientation information provided by an imaging platform can be used to reconstruct a three-dimensional scene in a fixed world, earth-based coordinate system. However, rather than triangulating image pixels directly into fixed, earth-based coordinates, which introduces considerable error, a relative reconstruction is first computed via image-based geometry, i.e., geometry derived from image feature correspondences without consideration of the point cloud's relationship to earth-based coordinates. In other words, the geolocation accuracy is improved using the relative distances provided by the SfM reconstruction based primarily on feature extraction and correspondence. Once a high-fidelity point cloud has been developed in this manner, a transformation between the relative coordinate system and a fixed, earth-based coordinate system is determined by comparing a number of points in the high-fidelity point cloud with corresponding points in a lower-fidelity point cloud reconstructed in the fixed, earth-based coordinate system. The resulting transformation is then used to place the high-fidelity point cloud in the fixed, earth-based coordinate system while preserving the image quality and avoiding degradation from errors in the physical sensor model such as errors in sensor position and orientation data. By placing the SfM point cloud in a fixed, earth-based coordinate system, increased geolocation accuracy is achieved for pixels in the original imagery that produce each three-dimensional point. The generation of geoaccurate point clouds in the absence of a DEM is a significant benefit of this approach and avoids any requirement to perform manual registration between the reconstructed image point cloud and known reference points.

By way of background, the physical sensor model of a camera traditionally includes a ground-to-image function, i.e., the analytical form that relates a point on the ground to a point at the image plane. The ground-to-image function of the sensor model may contain several linear and nonlinear operations of many parameters. Most modern Computer Vision algorithms assume a central projection camera model, and the matrix representations adequately represent the planar projection of pinhole camera geometry. To accommodate this representation, the ground-to-image function of the physical sensor model must be simplified to fit its form. The ground-to-image function for a system may be manifested in many forms, from the physical modeling of each individual component in the mechanical stack-up, to a reduced (less physically meaningful) frame camera model that follows the form of the collinearity equations commonly found in the literature. The techniques described herein are not limited to any particular physical sensor model or ground-to-image function representations.

By way of further background, the goal of SfM processing is to generate a three-dimensional point cloud that constitutes a reconstruction of structures or a scene in a three-dimensional coordinate system. A three-dimensional visualization can be rendered by performing surface reconstruction and image draping on the resulting point cloud according to known techniques. Essentially, common features (e.g., a corner of a building, the edge of a river, etc.) are identified in a set of two-dimensional images, and three-dimensional coordinates of features can be determined by tying together the features from the two-dimensional images, taking into consideration assumptions about the image collection system (e.g., one or more cameras). Thus, SfM processing initially involves applying a feature extraction algorithm to each of a plurality of two-dimensional images. The most common is the scale-invariant feature transform (SIFT) algorithm, due to its ability to provide a robust descriptor across varying image conditions. After image extraction, a table of descriptor matches can be computed across all combinations of descriptors for each image, effectively computing correspondences between images. A variety of known techniques are available, from brute-force feature matching to model fitting algorithms that employ random sample consensus (RANSAC).

At this point in the SfM process, image-to-image correspondences permit estimation of a series of fundamental matrices, which provide the necessary epipolar geometry for cursory triangulation. A coarse estimate of a three-dimensional sparse point cloud provides a series of equations that relate the image coordinate system to the relative or arbitrary world coordinate system (WCS). In particular, a "bundle adjustment" can be performed using the open source Bundler software to implement the initial estimation and refinement of the camera projection matrices, the SfM equivalent of the photogrammetric ground-to-image function. The cornerstone of this process is the Levenberg-Marquardt (L-M) algorithm. Like several other nonlinear optimization techniques, the L-M algorithm is predicated on linearizing the specified nonlinear model about some initial estimate of the parameters values. Specifically, the L-M algorithm belongs to a subclass of nonlinear optimization techniques commonly referred to as nonlinear least-squares. The objective is to find the model parameter values that minimize the sum squared error (SSE) criterion represented by the nonlinear least squares cost function.

Using this approach of estimating the fundamental matrix, performing triangulation, and iteratively refining the solution allows a scene to be reconstructed up to a projective ambiguity. In other words, the scene reconstruction is determined at best to within a projective transformation with respect to the WCS. In the field of Computer Vision, it is well known that methods exist to refine or "upgrade" the reconstruction to a metric reconstruction, in which the scene is determined up to a rotation, translation, and uniform scaling. However, it is desired in here to place the image-based, three-dimensional reconstruction into a fixed, earth-based coordinate system. Moreover, a methodology is required that is independent of available GCPs in the collection imagery.

The techniques described herein differ from other SfM approaches in both collection geometry and available information. Imagery is captured using one or more sensor platforms that know their position and orientation relative to a fixed coordinate system and can readily provide that information with each image in the metadata that is supplied with the image data (pixels) itself. For example, a sequence of two-dimensional images of a scene may be taken by a camera on an airborne platform with a global positioning system (GPS) and inertial navigation system (INS), and the measured earth-based position and orientation data from the GPS and INS are included for each image in the metadata. Within this context, there are two potential incorrect assumptions that deserve mention. First, it is an incorrect assumption that triangulation using the physical sensor model and existing metadata will produce a high-fidelity point cloud in the desired earth-based or fixed coordinate system. Second, it is an incorrect assumption that using existing metadata to initialize the parameter vector of the L-M algorithm of the SfM process will guide the bundle adjustment to a refined SfM solution in the desired coordinate system.

The first approach essentially bypasses developing a three-dimensional point cloud in a relative coordinate system and attempts to directly reconstruct a three-dimensional point cloud in fixed, earth-based coordinates by triangulating through the physical sensor model (e.g., using the image-to-ground function). This approach is likely to fail due to inherent inaccuracies in the parameter values of the physical sensor model, e.g., position and orientation parameters and static errors in the model itself. Even if a bundle adjustment has been performed, any remaining inaccuracies will lead to triangulation errors in the point cloud. Essentially, all the physical sensor model errors are introduced into point cloud solution, resulting in a much less accurate point cloud reconstruction, with every point having its own errors and significant inaccuracies in the relative distances between points in the point cloud.

Failure in the second approach may be more difficult to interpret. The SfM workflow establishes a geometry built upon image features, and adjustment procedures are implemented to reduce error between the corresponding features and cursory triangulation points. Camera projection matrices that result from this process have been designed to satisfy this process. The difficulty of this task is the mixing of image-based geometry with the geometry defined by the metadata and sensor model. Initializing the error minimization technique using the GPS (position) and INS (orientation) data introduces position and orientation errors into the same minimization process with feature extraction error and correspondence error. Even if accurate initialization values and accurate error estimates are available for all parameters that relate image feature points to triangulated points, noise in the metadata has been introduced into the relative point-to-point distances in the point cloud before it is necessary. In short, it is not sufficient merely to know the image-to-ground function of the image collection system, including position and orientation, to create a high-fidelity point cloud in a fixed, earth-based coordinate system. This information must be employed in such a manner that errors in the metadata and sensor model do not degrade the quality of the reconstructed point cloud.

Figure 1:
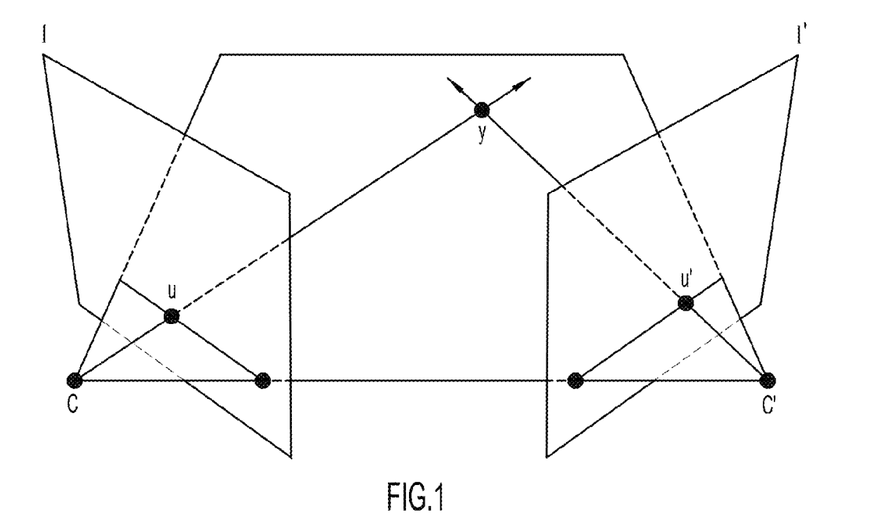
FIG. 1 is graphical representation of triangulation, in the absence of errors in image-based geometry, to determine a three dimensional point from corresponding image feature points depicted in two images.

The difficulty of attempting mix image-based geometry with geometry defined by the metadata and sensor model within the SfM process is illustrated visually in FIGS. 1-4. FIG. 1 shows an idealized triangulation of a feature point found in two, two-dimensional images in the absence of errors in the image geometry (e.g., each two-dimensional image can be represented by a two-dimensional array of pixel values). A first camera position has a camera center C that produces a first image in a first image plane I having an image feature point u, such a corner of a building. A second camera position has a camera center C' that produces a second image in a second image plane I' having an image feature point u' that corresponds to the same real-world feature as image feature point u, e.g., the same building corner. Rays extending from the camera centers C and C' through image feature points u and u' on corresponding epipolar lines interest at a three-dimensional point y in the epipolar plane.

Figure 2:
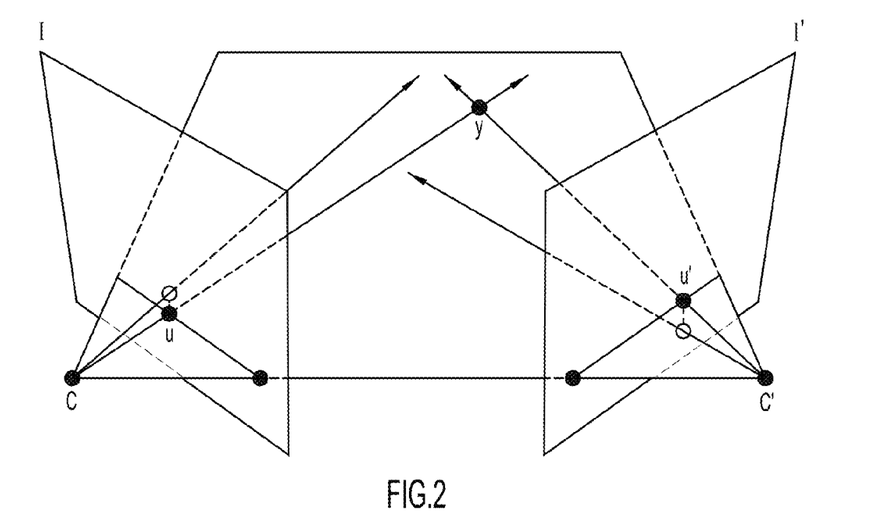
FIG. 2 is graphical representation of triangulation, in the presence of errors in the image-based geometry, to determine a three dimensional point from corresponding image feature points depicted in two images.

For the same scenario, FIG. 2 illustrates triangulation in the presence of errors in the image-based geometry (e.g., feature extraction errors and correspondence errors between images). Rays extending from camera centers C and C' through image feature points do not intersect at a point in the epipolar plane. However, two-dimensional features points may be projected onto the epipolar lines, accounting for error at the image planes I and I', and enabling trivial triangulation. In other words, the SfM process forces the image features to the correct geometry at the image plane by forcing image feature to lie on corresponding epipolar lines, and a trivial triangulation and well-defined feature points can still be obtained. This is referred to as optimal triangulation and allows the SfM process to converge to highly accurate point cloud solutions in a relative coordinate system relying on image-based geometry. Thus, a point cloud is obtained by applying the SfM methodology, and the result has been iteratively refined such that it is consistent with the image-based geometry.

Figure 3:
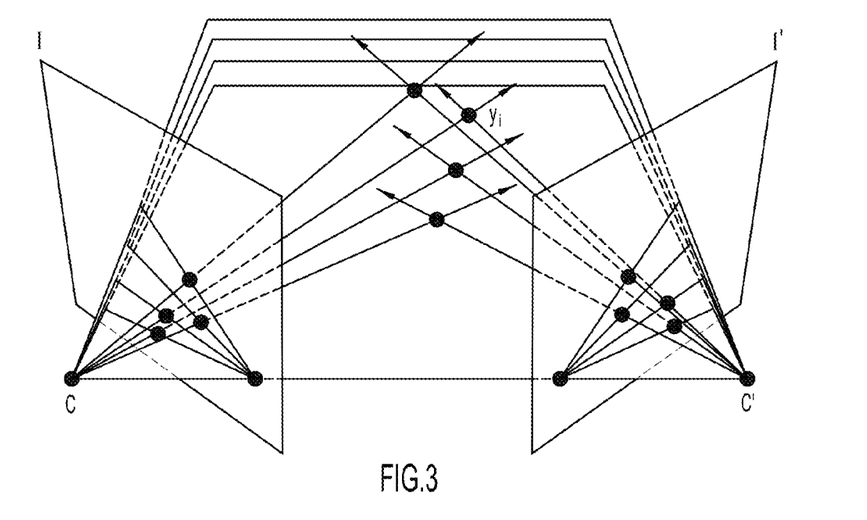
FIG. 3 is graphical representation of triangulation using refined, image-based geometry to determine a set of three dimensional points from corresponding image feature points depicted in two images.
Figure 4:
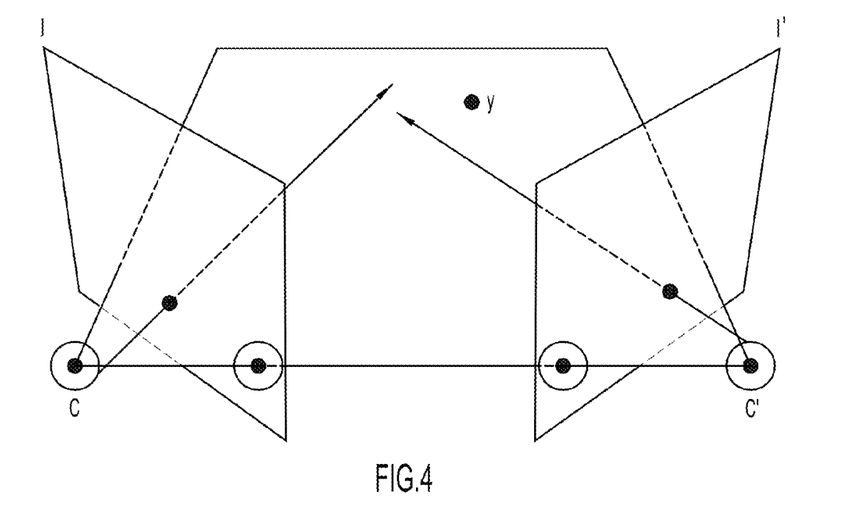
FIG. 4 is graphical representation of triangulation in the presence of errors in the camera position and orientation in which corresponding epipolar lines do not interest at a point in the epipolar plane.

However, even perfect image correspondences will fail to triangulate if the camera position and orientation do not agree with some fixed geometry, in this case, the image-based geometry. This problem is illustrated by FIGS. 3 and 4. FIG. 3 shows triangulation using refined image-based geometry for a set of points $y_i$ in the three-dimensional image relative point cloud. Rays extending from camera centers C and C' through image feature points consistent with the refined image-based geometry intersect at three-dimensional points $y_i$ in the respective epipolar planes. This is illustrated for several two-ray triangulations, which produces a point cloud in an arbitrary WCS. While it is desired to place the point cloud in fixed, earth-based coordinates, attempting to accomplish this via the SfM process introduces camera position and orientation errors into the point cloud solution.

In FIG. 4, triangulation in the presence of errors in the camera position and orientation is shown. The camera position and orientation errors are represented by error spheres around the camera centers C and C' and at the intersections between the epipolar plane and the image planes. Rays extending from camera centers C and C' through image feature points on corresponding epipolar lines do not intersect at a point in the epipolar plane due to the discrepancies between the metadata and image-based geometry, thereby preventing trivial triangulation. The GPS and INS reports provided in the image metadata contain random noise, and any remaining systematic error present in the sensor model will also contribute to uncertainty. Any attempt to control the camera position or orientation (with metadata) will modify the image-based geometry, resulting in significant errors in the three-dimensional point cloud.

Figure 5:
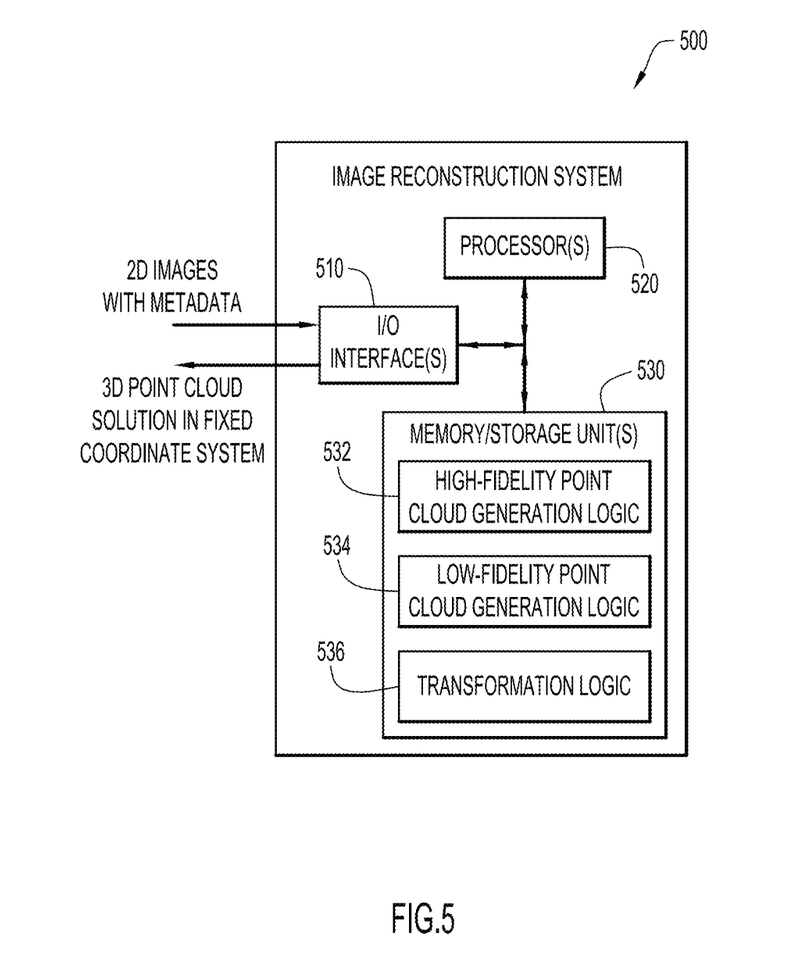
FIG. 5 is a functional block diagram illustrating an image reconstruction system for generating a geoaccurate three-dimensional image reconstruction via image-based geometry in accordance with the inventive concepts described herein.

To overcome the aforementioned difficulties, the high-fidelity point cloud produced in the SfM workflow may be placed in the desired coordinate system as a post-processing step by estimating the mapping between the relative coordinate system (the arbitrary WCS) of the image-based reconstruction and the desired fixed, earth-based coordinate system. FIG. 5 is a block diagram of an image reconstruction system 500 useful for explaining the inventive concepts described herein. Conceptually, image reconstruction system 500 comprises at least an input/output (I/O) interface 510, one or more processors 520, and at least one memory/storage unit 530. I/O interface(s) 510 can be one or more devices, e.g., an Ethernet card or module, configured to enable communications over a network according to any of a variety of networking protocols. Processor(s) 520 can be, for example, one or more microprocessors, microcontrollers, digital signal processors, etc. Memory/storage unit(s) 530 can be one or more tangible processor-readable or computer-readable memories that store or are encoded with instructions that, when executed by processor(s) 520 cause the processor(s) to perform the functions described herein. More specifically, as described in greater detail below, memory/storage unit(s) 530 can be encoded with high-fidelity point cloud generation logic 532, low-fidelity point cloud generation logic 534, and transformation generation and application logic, or simply "transformation" logic 536. Memory/storage unit(s) 530 can also store two-dimensional image data and associated metadata and sensor model data received via I/O interface 510, and data generated by logic 532, 534, and 536 when run on processor(s) 520, including the resulting three-dimensional point cloud solution in a fixed, earth-based coordinate system that can be supplied as output from image reconstruction system 500 via I/O interface 510.

While FIG. 5 shows a processing environment comprising one or more processors 520 that execute software stored in one or more memory/storage devices 530, an alternative processing environment is a fixed data processing element, such as an application specific integrated circuit (ASIC) that is configured, through fixed hardware logic, to perform logic functions. Yet another possible data processing environment is one involving one or more field programmable logic devices, or a combination of fixed processing elements and programmable logic devices. In one form, logic may be embodied in a tangible processor-readable medium that is encoded with instructions for execution by one or more processors that, when executed by the processor(s), operate to cause the processor(s) to perform the functions described herein. The architecture depicted in FIG. 5 is conceptual to illustrate major functional units, and does not necessarily illustrate physical relationships or imply any specific implementation.

Figure 6:
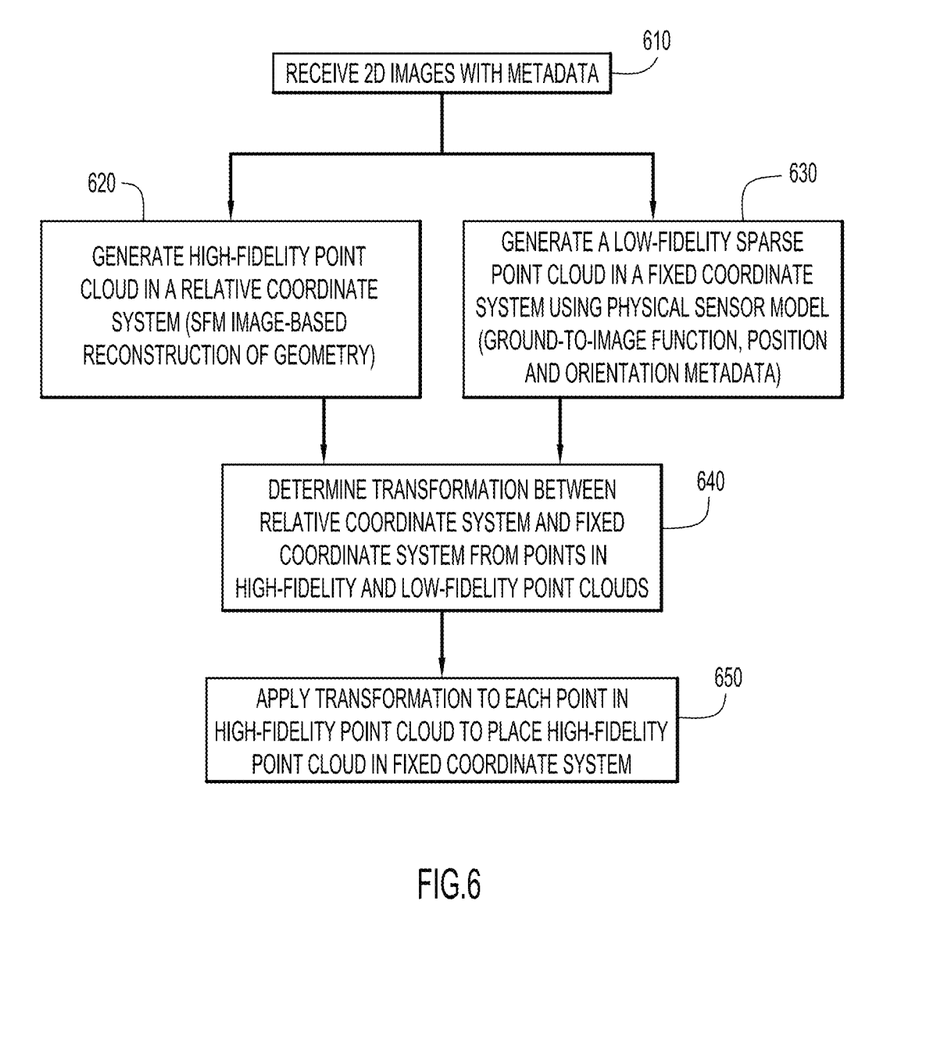
FIG. 6 is a flow diagram illustrating operations performed to generate a geoaccurate three-dimensional image reconstruction via image-based geometry in accordance with the inventive concepts described herein.

FIG. 6 is a top-level functional flowchart illustrating operations performed by image reconstruction system 500 to generate a high-fidelity geoaccurate three-dimensional scene reconstruction. In operation 610, image reconstruction system 500 receives a plurality of two-dimensional images of a scene. To enable a three-dimensional rendering, the images should be taken from different views or look angles of the scene. This can be accomplished by taking images from a sensor moving relative to the scene taking a sequence of images (e.g., a circling aircraft equipped with a camera) or by having a plurality of stationary or mobile sensors taking images from different look angles (or both).

The sensor(s) can be any form of sensor capable of generating an image, such as a digital camera that generates a two-dimensional array of pixel values from detection of visible light, or analogous sensors that detect electromagnetic radiation at other wavelengths (e.g., RF, IR, ultraviolet, x-rays, etc.) and generate an array of values representing variation in the intensity of the radiation over an area (e.g., radar, lidar, etc.). The sensor(s) can also take the form of devices capable of detecting and rendering an image of the presence of various substances or compositions of matter in a scene, e.g., water vapor, hazardous materials, geological deposits, etc. Thus, an "image" supplied to the image reconstruction system can be any of a wide variety of renderings involving an array of values that potentially vary over a region or scene to reveal the presence of features. Features within a scene to be reconstructed can include any distinctive or identifiable structures (e.g., solid, liquid, vapor, particulate cloud, etc.) including man-made structures such as buildings, roads, and bridges and naturally occurring structures and geographical features such as ground topology, rivers, lakes, foliage, etc.

The sensor(s) can be mounted on any of a variety of mobile platforms such as in a portable, hand-carried device, on a ground or maritime vehicle, an airborne vehicle, or a satellite. The sensor(s) can also include those mounted on stationary platforms, though this would require either multiple sensors at different locations or a target object or structure that is moving at an angle relative to the platform in order to generate multiple look angles. In any of these cases, to enable ultimately placing the reconstructed three-dimensional rendering in a fixed coordinate system, such as earth-based coordinates, the position and orientation of the sensor(s) must known relative to the fixed coordinate system for each image taken. By way of a non-limiting example, the sensor platform can include a GPS receiver capable of determining the platform position via reception of GPS satellite signals. Terrestrial-based position determining schemes can also be employed to determine position.

Three-dimensional sensor orientation can be determined, for example, by an on-board inertial navigation system (INS) employing gyroscopes or the like to detect angular movement of the sensor relative to the fixed coordinate system. The position and orientation of the sensor(s) relative to the fixed coordinate system can be supplied to the image reconstruction system as metadata included with the image data itself for each image. Optionally, other aspects of the image-to-ground function of the physical sensor model (which essentially maps pixels to their ground coordinates), such as information about the sensor's characteristics, can be supplied via the metadata or as a separate transmission over the same or a different link.

Referring again to FIGS. 5 and 6, image reconstruction system 500 generates a high-fidelity point cloud in a relative coordinate system (operation 620) by processing high-fidelity point cloud generation logic 532 and generates a low-fidelity sparse point cloud in a fixed coordinate system (operation 630) by processing low-fidelity point cloud generation logic 534. While in the examples described herein, the fixed coordinate system is an earth-based coordinate system, the term fixed coordinate system as used herein and in the claims is not strictly limited to an earth-based coordinate system, and any coordinate system relative to which the sensor(s) position and orientation are known can serve as a fixed coordinate system.

The high-fidelity point cloud is generated in the relative coordinate system (e.g., an arbitrary WCS) using, for example, an SfM image-based reconstruction of the geometry of a scene. As previously described, an SfM workflow operating on the image-based geometry is advantageous in that it provides a high-fidelity reconstruction of a scene that is not achievable by direct triangulation of corresponding image features through their respective physical sensor models. This is because the primary errors that occur in the image-based geometry result from feature extraction errors and correspondence errors, which are relatively small. The resulting high-fidelity point cloud provides a clean scene reconstruction in the relative coordinate system, where relative distances between points are consistent because features were extracted from images themselves. Any error minimization that occurs via the L-M algorithm of the SfM process minimizes error in a visual sense based on features in the images. The overall goal of the system is to preserve this precision in final image solution, i.e., to maintain the high-fidelity point cloud while placing it in the fixed coordinate system without altering its structure or relative distances within the point cloud.

While FIGS. 5 and 6 show image reconstruction system 500 performing the generation of the high-fidelity point cloud along with generation of the low-fidelity point cloud, according to another implementation, image reconstruction system 500 can receive a previously constructed high-fidelity point cloud as an input from an external source (e.g., a lidar system employing SfM to generate its own high-fidelity point cloud), thereby allowing image reconstruction system 500 to bypass generation of the high-fidelity point cloud and to perform the other operations while relying on the received high-fidelity point cloud without having to construct the high-fidelity point cloud itself.

The high-fidelity point cloud reconstruction can be placed in the fixed coordinate system via the remaining operations shown in FIG. 6. First, a low-fidelity sparse point cloud is generated to serve as a reference in the desired fixed (earth-based) coordinate system (operation 630). Three pieces of critical information enable this multi-image triangulation: refined pixel correspondences across multiple views from the SfM workflow; image metadata containing GPS/INS position and orientation information; and complete knowledge of the ground-to-image function of the collection system. As previously explained, introduction of the position, orientation, and sensor model errors into the process significantly reduce the accuracy of the resulting point cloud. Thus, as used herein and in the claims, a high-fidelity point cloud refers to a point cloud constructed in a relative coordinate system dependent on image-based geometry and not on geometry based on metadata and a physical sensor model (position and orientation of the sensor(s) relative to a fixed coordinate system), such that the relatively small errors in the point cloud solution are due primarily to errors in the image-based geometry such as feature extraction and correspondence errors. A low-fidelity point cloud refers to a point cloud constructed in a fixed coordinate system which additionally introduces errors in the geometry based on metadata and the physical sensor model (position and orientation of the sensor(s) relative to the fixed coordinate system), resulting in relatively large errors in the point cloud solution. A high-fidelity point cloud has a higher fidelity (e.g., smaller errors in location of points in the point cloud and smaller errors in the relative distances between points) than a corresponding low-fidelity point cloud constructed from the same two-dimensional images.

To generate the low-fidelity point cloud, a simple direct linear triangulation algorithm is easily extensible to correspondences across multiple views. The least-squares solution to the multi-image triangulation problem is sought. More specifically, for each set of feature correspondences, the SSE of their projected intersection is minimized. New sensor projection matrices corresponding to each view are derived from the physical sensor model and the available metadata. To avoid numerical instability due to matrices with poor condition number, a normalization matrix is formulated for each view that effectively centers pixel measurements (from that view) and scales the mean magnitude to $\sqrt{2}$. Each 2-dimensional image point $u_{i,j}$ may be expressed as a mapping from a three-dimensional point $x_i$ in the fixed earth-based coordinate system through the 3×4 camera projection matrix $P_j$ for a particular view j. In homogeneous coordinates, $$u_{i,j} = P_j x_i \tag{1}$$

which can be rewritten as a cross product $$0 = u_{ij} \otimes P_j x_i \tag{2}$$

$$= \begin{bmatrix} u_{i,j} \\ v_{i,j} \\ w_{i,j} \end{bmatrix} \otimes \begin{bmatrix} p_{1,j}^T \\ p_{2,j}^T \\ p_{3,j}^T \end{bmatrix} \begin{bmatrix} x_i \\ y_i \\ z_i \\ 1 \end{bmatrix}$$

$$= \begin{bmatrix} u_{i,j} \\ v_{i,j} \\ w_{i,j} \end{bmatrix} \otimes \begin{bmatrix} p_{1,j}^T x_i \\ p_{2,j}^T x_i \\ p_{3,j}^T x_i \end{bmatrix}$$

which is a matrix of RANK=2 for w=1. It is desired for image points $u_{i,j}$ to correspond to a single triangulated point $x_i$, $$\begin{aligned} u_{i,1} &= P_1 x_i \\ u_{i,2} &= P_2 x_i \\ &\vdots = \vdots \\ u_{i,n} &= P_n x_i \end{aligned} \tag{3}$$

Using the previous formulation, the system of equations above may be expressed as $$\begin{bmatrix} u_{i,1}p_{3,1}^T x_i - p_{2,1}^T x_i \\ v_{i,1}p_{3,1}^T x_i - p_{1,1}^T x_i \\ u_{i,2}p_{3,2}^T x_i - p_{2,2}^T x_i \\ v_{i,2}p_{3,2}^T x_i - p_{1,2}^T x_i \\ \vdots \\ u_{i,n}p_{3,n}^T x_i - p_{2,n}^T x_i \\ v_{i,n}p_{3,n}^T x_i - p_{1,n}^T x_i \end{bmatrix} \quad (4)$$

or simply $$Ax_i = 0 \quad (5)$$

The vector $x_i$ that minimizes $\|Ax\|$ subject to the condition $\|x\|=1$ is the unit eigenvector with the smallest eigenvalue of the matrix $A^TA$, i.e., the last column of V in the singular value decomposition (SVD) $A=U\Sigma V^T$; this is the $i^{th}$ triangulated point. The process is repeated for all suitable image feature correspondences established in the SfM framework. Care should be taken to ensure that the assumed coordinate system of the focal plane array (FPA) is consistent (or accounted for) between the SfM approach, e.g., Bundler, and the physical sensor model.

Figure 7:
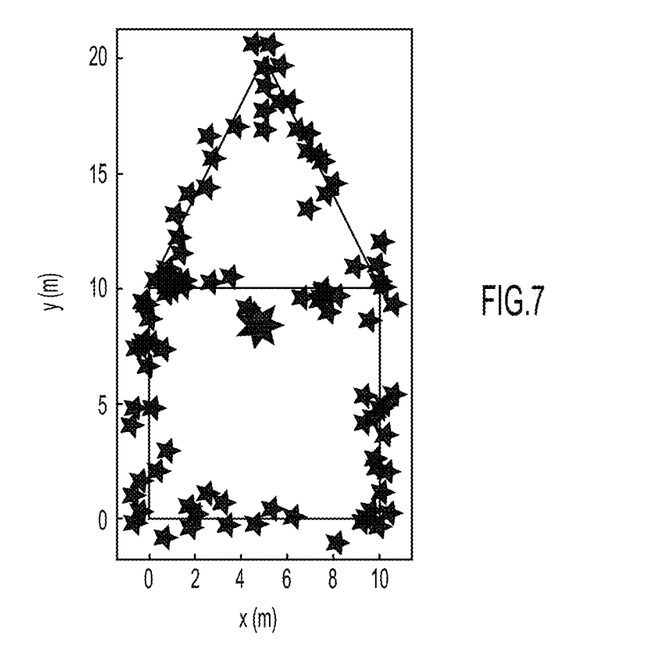
FIG. 7 is a graphical representation of a two-dimensional low-fidelity point cloud in a fixed coordinate system representing the results of the triangulation algorithm using position and orientation data (e.g., GPS and INS telemetry data).
Figure 8:
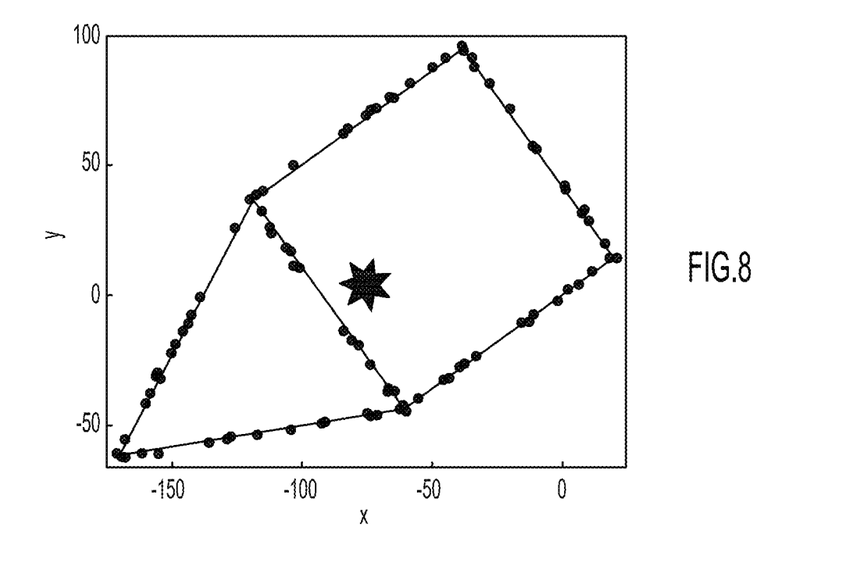
FIG. 8 is a graphical representation of a two-dimensional high-fidelity point cloud in a relative coordinate system representing the SfM image-based reconstruction of the geometry of the same structure shown in FIG. 7.

This method of triangulation minimizes the error in the coordinate system of the reconstruction rather than forcing error minimization at the image plane, which is customary in the SfM methodology. This step is necessary in the absence of GCPs to establish the relationship between the fixed coordinate system (e.g., arbitrary WCS) of the SfM reconstruction. At this point in the processing, two point clouds exist: one high-fidelity point cloud in a fixed coordinate system and one low-fidelity point cloud in a fixed coordinate system. There is a one-to-one mapping between each three-dimensional point in the two point clouds; a simple example is shown in FIGS. 7 and 8, which respectively illustrate a low-fidelity point cloud and a corresponding high-fidelity point cloud. For ease of visualization, these point clouds depict a very simple, two-dimensional "house" structure. It will be appreciated that actual point clouds are typically three-dimensional renderings, requiring translation, scaling, and rotation in three dimensions.

As previously indicated, the low-fidelity point cloud can be constructed as a sparse point cloud with significantly fewer points that the full high-fidelity point cloud. In this case, a corresponding sparse high-fidelity point cloud is constructed from a subset of the points in high-fidelity point cloud to determine the transformation. A variety of options exist for selecting which and how many points in the high-fidelity point cloud are to be included in the sparse high-fidelity point cloud. For example, only those points whose estimated error is below a certain threshold can be used. According to another option, only points that appear in a minimum number of the original two-dimensional images are used. At a minimum, the sparse point cloud requires at least the number of points corresponding to the number of degrees of freedom in a three dimensional similarity transform and a spatial distribution over the entire scene to be reconstructed. The sparse low-fidelity point cloud is constructed to have points corresponding the high-fidelity point cloud.

Once the high-fidelity and low-fidelity sparse point clouds have been generated, in operation 640, image reconstruction system 500 determines the transformation between these the relative coordinate system of the high-fidelity point cloud and the fixed coordinate system of the low-fidelity point cloud via comparison of the two sparse point clouds in accordance with transformation logic 536 (FIG. 5). Ideally, the two point clouds are related by a translation, a uniform scale factor, and a rotation, but there is uncertainty present in both data sets. It should be noted that the image feature correspondences used for scene reconstruction have an associated error value from the final error vector ϵ of the L-M bundle adjustment solution after convergence. This error vector ϵ may be used to select a desired number of correspondences with the lowest image-based triangulation error, effectively reducing the size of each point cloud (and computation time), as noted above.

Figure 9:
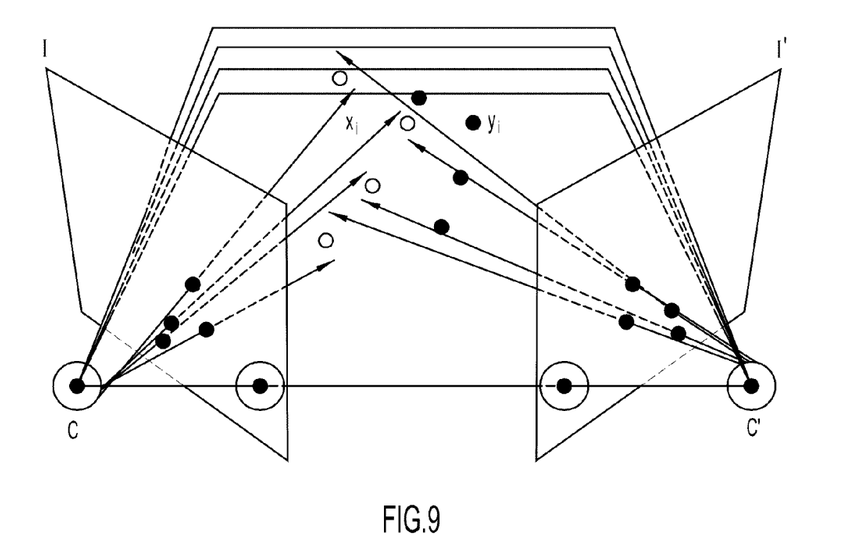
FIG. 9 is graphical representation of triangulation using image-based geometry to generate a high-fidelity point cloud $y_i$ in a relative coordinate system and a low-fidelity point cloud $x_i$ in a fixed coordinate system using the physical sensor model and metadata (e.g., sensor position and orientation data).
Figure 10:
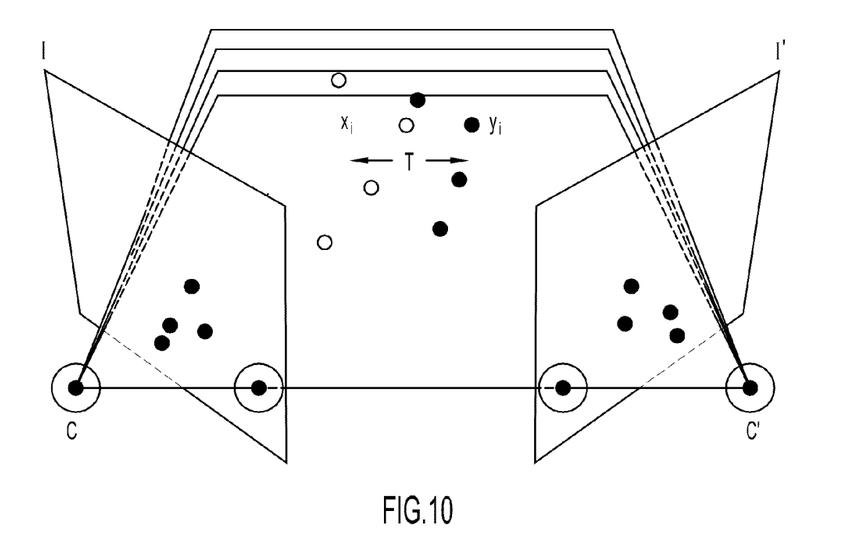
FIG. 10 is graphical representation of a point cloud transformation involving generating a transformation matrix T that maps the relative coordinate system of the high-fidelity point cloud $y_i$ to the fixed coordinate system of the low-fidelity point cloud $x_i$.

The concept of developing a transformation between the coordinate systems is illustrated conceptually in FIGS. 9 and 10. In FIG. 9, the set of points $y_i$ (solid dots) represent the sparse high-fidelity point cloud while the set of points $x_i$ (empty dots) represent the sparse low-fidelity point cloud. For the low-fidelity point cloud $x_i$, rays extending from the camera centers C and C', with uncertainty in position and orientation, through image feature points consistent with the refined image-based geometry intersect at three-dimensional points $x_i$ in the epipolar plane. This is illustrated for several two-ray triangulations, which produces a point cloud in a fixed, earth-based coordinate system. FIG. 10 shows a simplified point cloud transformation in which points from both point clouds are related by a similarity transformation matrix T. This matrix maps the high-fidelity point cloud $y_i$ to the fixed coordinate system of the low-fidelity point cloud points $x_i$.

Figure 11:
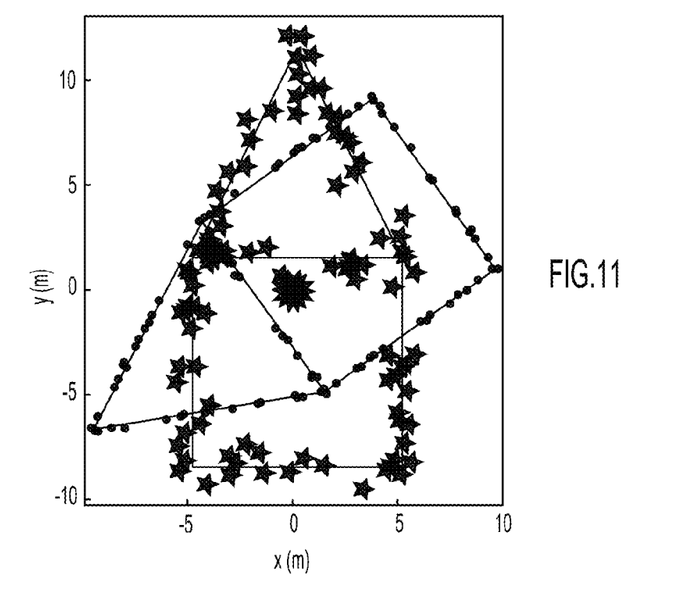
FIG. 11 is a graphical representation of a centered and scaled high-fidelity point cloud relative to the low-fidelity point cloud, corresponding to the two-dimensional example shown in FIGS. 9 and 10.

The relative (high-fidelity) and triangulated (low-fidelity) point clouds are centered such that their respective means are zero, and the difference between lengths of the new mean vectors is computed to determine the uniform scale factor. Points in the centered, relative point cloud are then scaled such that the two point clouds have the same mean vector length, as shown in FIG. 11. In the ideal, noise-free case, the remaining transformation is a pure frame rotation. However, noise is present, and performing QR decomposition on the least-squares solution matrix reveals a matrix $\hat{R}$ that deviates from an orthonormal matrix, indicating that the matrix is no longer a pure rotation. Performing a full least squares solution for the remaining nine elements does not accurately represent the remaining three degrees of freedom (DOF), the three-dimensional rotation parameters, so an SVD approach is used to solve for these rotation parameters, exclusively.

In particular, the Kabsch algorithm is used to find the optimal rotation (least-squares sense) between the centered and scaled relative and triangulated data. A brief derivation of the Kabsch algorithm can be shown by minimizing the following cost function $$\mathfrak{I}_{LLS}(R) = \sum_{i=1}^{n} |Ry_i - x_i|^2 \quad (6)$$

where R is the rotation matrix, and $x_i$ is a triangulated data point in the fixed (earth-based) coordinate system that corresponds to the point $y_i$ in the relative (arbitrary world) coordinate system. The cost function in Equation 6 can be written in a matrix form $$\mathfrak{I}_{LLS}(R) = Tr((RY-X)^T(RY-X)) \quad (7)$$

$$= Tr(Y^TY + X^TX) - 2Tr(X^TRY) \quad (8)$$

where X and Y are both 3×n matrices consisting of columns made by the inhomogeneous coordinates of each point. From Equation 8, the cost function $\Im L_{LLS}(R)$ is minimized when Tr ($X^T RY$) is maximized. By using the cyclic properties of the trace operator and replacing the product $YX^T$ by its SVD, we have $$Tr(X^T RY) = Tr(YX^T R) = Tr(U\Sigma V^T R) = Tr(\Sigma V^T RU) \quad (9)$$

which is maximized if the product $V^T RU$ is equal to the identity matrix. Recall that U and V are unitary matrices, and R is an orthonormal matrix. Solving for the rotation matrix, $$R = VU^T \quad (10)$$

The previous derivation has not explicitly eliminated the possibility that the calculated "rotation" matrix does not also include a reflection about the origin. This can be checked and fixed by calculating the determent of $VU^T$. Let d=Det ($VU^T$), then a robust calculation of R is $$R = V \begin{pmatrix} 1 & 0 & 0 \\ 0 & 1 & 0 \\ 0 & 0 & d \end{pmatrix} U^T \quad (11)$$

Figure 12:
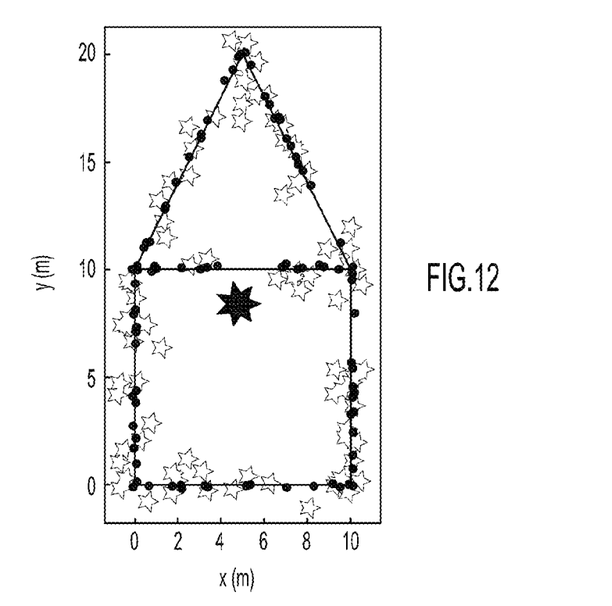
FIG. 12 is a graphical representation of an optimal rotation of the high-fidelity point cloud relative to the low-fidelity point cloud shown in FIG. 11 in order to place the high-fidelity point cloud in the fixed coordinate system.

FIG. 12 illustrates, in a simplified, two-dimensional example, the final rotation of the high-fidelity point cloud using the rotation matrix R to complete the process of placing the high-fidelity point cloud in the fixed coordinate system.

Once the optimal rotation matrix R, uniform scale, and translation parameters have been derived from the sparse point clouds, in operation 650, image reconstruction system 500 can then apply the transformation to each point in the more dense high-fidelity point cloud with the same geometry to place the high-fidelity point cloud in the fixed (earth-based) coordinate system. In this manner, the high level of accuracy and precise relative distances between points of the high-fidelity point cloud are preserved in the final, geoaccurate three-dimensional scene reconstruction (i.e., the relative errors between points result largely from the image-based geometry errors rather than the position and orientation errors of the physical sensor model).

The technology described herein supports the automatic generation of geoaccurate three-dimensional models produced from imagery captured by several different sources, which include: wide area motion imagery (WAMI) systems; commercial aerial sensors (e.g., pictometry); commercial remote sensing satellites (e.g., Digital Globe); aerial full motion video systems; and national and tactical military ISR assets. The automated techniques described herein reduce labor-intensive, manual methods that are currently used to develop three-dimensional models. These models are used in several applications which include, but are not limited to: web visualization of three-dimensional maps of cities (e.g., Google Earth/Maps, Microsoft Bing Maps, and Apple Maps); visual assessment of targets and other locations; disaster response; view shed analysis; gaming industry (e.g., automatic generation of realistic cities for games), the insurance industry; and augmented reality.

Having described example embodiments of a new and improved technique for reconstruction of geoaccurate three-dimensional images via image-based geometry, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of generating a three-dimensional reconstruction of a scene, the method comprising:
generating a high-fidelity point cloud representing a three-dimensional reconstruction of a scene from a plurality of two-dimensional images generated by at least one sensor whose position and orientation are known relative to a fixed coordinate system for each of the two-dimensional images, the high-fidelity point cloud being generated in a relative coordinate system without regard to the position and orientation of the at least one sensor relative to the fixed coordinate system;
generating in the fixed coordinate system a low-fidelity point cloud representing a three-dimensional reconstruction of the scene from the plurality of two-dimensional images using the position and orientation of the at least one sensor relative to the fixed coordinate system such that the high-fidelity point cloud and the low-fidelity point cloud are generated from the same plurality of two-dimensional images, the low-fidelity point cloud having a lower fidelity than the high-fidelity point cloud due to physical sensor model errors in the position and orientation of the at least one sensor;
determining a transformation between the relative coordinate system and the fixed coordinate system based on a relationship between points in the high-fidelity point cloud and corresponding points in the low-fidelity point cloud; and
converting the high-fidelity point cloud from the relative coordinate system to the fixed coordinate system by applying the transformation to points in the high-fidelity point cloud, wherein an impact of the physical sensor model errors on the high-fidelity point cloud in the fixed coordinate system is limited to errors introduced in the transformation.

2. The method of claim 1, wherein the high-fidelity point cloud is generated using structure from motion (SfM) processing.

3. The method of claim 1, wherein the relative coordinate system is an arbitrary world coordinate system (WCS) and the fixed coordinate system is an earth-based coordinate system, and wherein the low-fidelity point cloud is generated based on a ground-to-image function of the at least one sensor.

4. The method of claim 1, wherein the transformation is determined using a sparse high-fidelity point cloud containing only a subset of the points in the high-fidelity point cloud.

5. The method of claim 1, wherein the transformation is applied to the high-fidelity point cloud via a transformation matrix that performs translation, scaling and rotation to each point in the high-fidelity point cloud such that relative distances between the points in the high-fidelity point cloud are maintained in the fixed coordinate system.

6. The method of claim 1, wherein the high-fidelity point cloud is converted from the relative coordinate system to the fixed coordinate system without use of a digital elevation map (DEM) or ground control points (GCPs).

7. The method of claim 1, wherein the position and orientation of the at least one sensor are received as metadata associated with each of the plurality of two-dimensional images, the metadata including global positioning system (GPS) data and inertial navigation system (INS) data.

8. An image reconstruction system for generating a three-dimensional reconstruction of a scene, comprising:
an interface configured to receive a plurality of two-dimensional images generated by at least one sensor whose position and orientation are known relative to a fixed coordinate system for each of the two-dimensional images; and
a processor configured to:
generate a high-fidelity point cloud representing a three-dimensional reconstruction of a scene from the plurality of two-dimensional images, the high-fidelity point cloud being generated in a relative coordinate system without regard to the position and orientation of the at least one sensor relative to the fixed coordinate system;
generate in the fixed coordinate system a low-fidelity point cloud representing a three-dimensional reconstruction of the scene from the plurality of two-dimensional images using the position and orientation of the at least one sensor relative to the fixed coordinate system such that the high-fidelity point cloud and the low-fidelity point cloud are generated from the same plurality of two-dimensional images, the low-fidelity point cloud having a lower fidelity than the high-fidelity point cloud due to physical sensor model errors in the position and orientation of the at least one sensor;
determine a transformation between the relative coordinate system and the fixed coordinate system based on a relationship between points in the high-fidelity point cloud and corresponding points in the low-fidelity point cloud; and
convert the high-fidelity point cloud from the relative coordinate system to the fixed coordinate system by applying the transformation to points in the high-fidelity point cloud, wherein an impact of the physical sensor model errors on the high-fidelity point cloud in the fixed coordinate system is limited to errors introduced in the transformation.

9. The system of claim 8, wherein the processor is further configured to generate the high-fidelity point cloud using structure from motion (SfM) processing.

10. The system of claim 8, wherein the relative coordinate system is an arbitrary world coordinate system (WCS) and the fixed coordinate system is an earth-based coordinate system, and wherein the processor is further configured to generate the low-fidelity point cloud based on a ground-to-image function of the at least one sensor.

11. The system of claim 8, wherein the processor is further configured to determine the transformation using a sparse high-fidelity point cloud containing only a subset of the points in the high-fidelity point cloud.

12. The system of claim 8, wherein processor is further configured to apply the transformation to the high-fidelity point cloud via a transformation matrix that performs translation, scaling and rotation to each point in the high-fidelity point cloud such that relative distances between the points in the high-fidelity point cloud are maintained in the fixed coordinate system.

13. The system of claim 8, wherein the processor is further configured to convert the high-fidelity point cloud from the relative coordinate system to the fixed coordinate system without use of a digital elevation map (DEM) or ground control points (GCPs).

14. The system of claim 8, wherein the interface is further configured to receive the position and orientation of the at least one sensor as metadata associated with each of the plurality of two-dimensional images, the metadata including global positioning system (GPS) data and inertial navigation system (INS) data.

15. A non-transitory computer readable medium encoded with software comprising processor-executable instructions that, when executed by one or more processors, cause the one or more processors to perform functions of:
generate a high-fidelity point cloud representing a three-dimensional reconstruction of a scene from a plurality of two-dimensional images generated by at least one sensor whose position and orientation are known relative to a fixed coordinate system for each of the two-dimensional images, the high-fidelity point cloud being generated in a relative coordinate system without regard to the position and orientation of the at least one sensor relative to the fixed coordinate system;
generate in the fixed coordinate system a low-fidelity point cloud representing a three-dimensional reconstruction of the scene from the plurality of two-dimensional images using the position and orientation of the at least one sensor relative to the fixed coordinate system such that the high-fidelity point cloud and the low-fidelity point cloud are generated from the same plurality of two-dimensional images, the low-fidelity point cloud having a lower fidelity than the high-fidelity point cloud due to physical sensor model errors in the position and orientation of the at least one sensor;
determine a transformation between the relative coordinate system and the fixed coordinate system based on a relationship between points in the high-fidelity point cloud and corresponding points in the low-fidelity point cloud; and
convert the high-fidelity point cloud from the relative coordinate system to the fixed coordinate system by applying the transformation to points in the high-fidelity point cloud, wherein an impact of the physical sensor model errors on the high-fidelity point cloud in the fixed coordinate system is limited to errors introduced in the transformation.

16. The non-transitory computer readable medium of claim 15, wherein the instructions to generate the high-fidelity point cloud comprise instructions that cause the one or processors to generate the high-fidelity point cloud using structure from motion (SfM) processing.

17. The non-transitory computer readable medium of claim 15, wherein the relative coordinate system is an arbitrary world coordinate system (WCS) and the fixed coordinate system is an earth-based coordinate system, and wherein the instructions to generate the low-fidelity point cloud comprise instructions that cause the one or more processors to generate the low-fidelity point cloud based on a ground-to-image function of the at least one sensor.

18. The non-transitory computer readable medium of claim 15, wherein the instructions to determine the transformation comprise instructions that cause the one or processors to determine the transformation using a sparse high-fidelity point cloud containing only a subset of the points in the high-fidelity point cloud.

19. The non-transitory computer readable medium of claim 15, wherein the instructions to convert the high-fidelity point cloud comprise instructions that cause the one or more processors to apply the transformation to the high-fidelity point cloud via a transformation matrix that performs translation, scaling and rotation to each point in the high-fidelity point cloud such that relative distances between the points in the high-fidelity point cloud are maintained in the fixed coordinate system.

20. The non-transitory computer readable medium of claim 15, wherein the instructions to convert the high-fidelity point cloud comprise instructions that cause the one or more processors to convert the high-fidelity point cloud from the relative coordinate system to the fixed coordinate system without use of a digital elevation map (DEM) or ground control points (GCPs).

* * * * *